United States Patent [19]
Calistrat

[11] 3,724,239
[45] Apr. 3, 1973

[54] RESILIENT COUPLING

[75] Inventor: Michael M. Calistrat, Baltimore, Md.

[73] Assignee: Koppers Company, Inc., Pittsburgh, Pa.

[22] Filed: Feb. 8, 1972

[21] Appl. No.: 224,505

[52] U.S. Cl.....................64/13, 64/27 NM, 64/11 R
[51] Int. Cl................................................F16d 3/78
[58] Field of Search............64/13, 12, 11, 27 NM, 14

[56] References Cited

UNITED STATES PATENTS

| | | | |
|---|---|---|---|
| 1,546,755 | 7/1925 | Schulte | 64/13 |
| 3,238,742 | 3/1966 | Martorana | 64/11 R |
| 3,296,827 | 1/1967 | Landon et al. | 64/13 |
| 3,353,373 | 11/1967 | Schmacher et al. | 64/11 R |
| 3,425,240 | 2/1969 | Feller et al. | 64/11 R |
| 3,678,708 | 7/1972 | Ernst et al. | 64/11 R |

Primary Examiner—Charles J. Myhre
Assistant Examiner—Randall Heald
Attorney—Boyce C. Dent et al.

[57] ABSTRACT

A coupling for two generally coaxially aligned shafts which comprises an annulus having a series of rectilinear, resilient, and compressible columns connected with their longitudinal axes along the sides of a flat polygon. Arms project transversely from the longitudinal axes at each intersection of two adjacent columns; the arms alternately project from the front and rear faces of each of the adjacent columns with respect to the plane of the flat polygon. Hubs are secured on each of the shafts for receiving the alternate arms on the annulus respectively; fasteners operate radially through each arm for securing the arms to the hubs and decreasing the radius of the annulus thereby placing the columns under a precompressive load. A recess is formed on each of the front and rear faces of each column extending from the projection of the arms toward the opposite end of each column for reducing axial thrust during compression of the annulus.

30 Claims, 8 Drawing Figures

019
RESILIENT COUPLING

CROSS-REFERENCES

This invention relates generally to co-pending design application Ser. No. 228,785, filed Feb. 23, 1972 (assigned to the assignee of the present invention and claiming the esthetic appearance of the elastomeric annulus disclosed herein.

BACKGROUND OF THE INVENTION

1. Field of the Invention

This invention relates generally to flexible shaft couplings utilizing a yielding element for transmitting rotary motion between two generally aligned shafts.

2. Description of the Prior Art

Attempts have been made heretofore to make flexible couplings from a non-metallic, resilient material, such as rubber, because of the advantages imparted to the couplings. For example, they require no lubrication; they are usually economical to manufacture; and they are torsionally resilient. In most instances, the connected equipment is subject to shock loads. The nature of the coupling determines the extent to which the shock is transmitted from one shaft to the other. Resilient couplings are especially attractive for applications where a minimum transmission of the shock loads is desired.

Couplings of such materials, however, have not been particularly successful because of the disadvantages attendant with the use of the resilient material. Natural rubber, for example, has poor mechanical properties in tension; it tends to crack thereby exposing a greater surface area to ozone attack. A synthetic rubber, such as neoprene or Buna N is not so subject to ozone attack. These synthetic rubbers, however, have mechanical properties that are poorer as far as couplings are concerned than natural rubber, especially in those applications where the coupling is subjected to stresses resulting from torsional loads, and from axial and angular misalignment.

The foregoing disadvantages have been generally overcome by attaching a precompressed elastomeric annulus between a pair of hubs mounted on a pair of substantially coaxially aligned shafts. An example of this type coupling is shown in Landon et al. U.S. Pat. No. 3,296,827.

However, it has been found in some instances that precompression of the elastomeric annulus causes axial thrust forces to be created in the annulus which are transmitted through its connections to the shafts. Such axial thrust forces are generally undesirable where the shafts are mounted in bearings. Even at zero torque and zero misalignment the axial thrust forces may be extremely large and when imparted to the shafts will cause unwanted stresses and forces on the shafts bearings, which may sometimes cause excessive bearing wear and shortened bearing life.

SUMMARY OF THE INVENTION

Accordingly, an object of the present invention is to provide a resilient coupling that will overcome the aforementioned disadvantages and others. Thus, this invention provides for a flexible coupling which utilizes a resilient compressible material which is preloaded in compression as disclosed in Landon et al. U.S. Pat. No. 3,296,827; and, in addition, this invention effectively reduces the axial thrust forces inherent in the abovementioned type of coupling and others.

This is generally accomplished by providing an annulus with a series of rectilinear, resilient, and compressible columns connected with their longitudinal axes along the sides of a flat polygon. Arm means project transversely from the longitudinal axes at each intersection of two adjacent columns. These arm means alternately project from the front and rear faces of each of the adjacent columns with respect to the plane of the flat polygon.

A hub means is provided on each of the shafts for receiving alternate ones of the arm means respectively. A fastening mean is provided which operates radially through the arm means to the hub means for decreasing the radius of the polygon thereby placing the columns under a precompressive load.

The annulus is further provided with a recess on each of the front and rear faces of the columns. These recesses extend from the projection of the arm means toward the opposite end of the columns and affects the characteristics of the annulus in such a manner that the axial thrust forces created by precompression of the annulus are substantially reduced and sometimes eliminated entirely, at any torque level.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED EMBODIMENT

Figure 1:
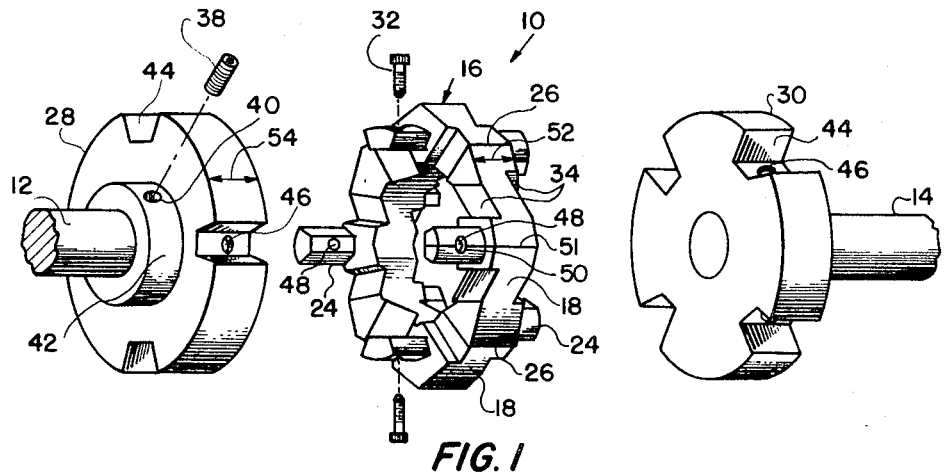
FIG. 1 is an exploded perspective view of the resilient coupling of the present invention.
Figure 3:
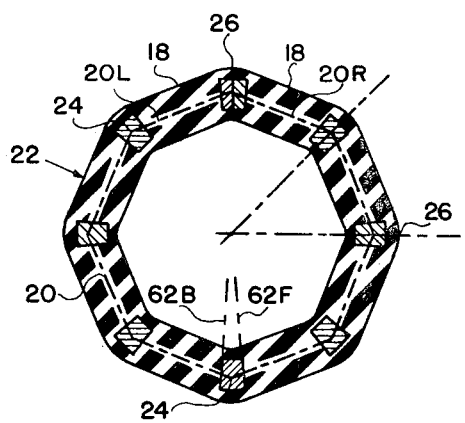
FIG. 3 is a front elevational view of the annulus of FIG. 1 in cross-section.
Figure 7:
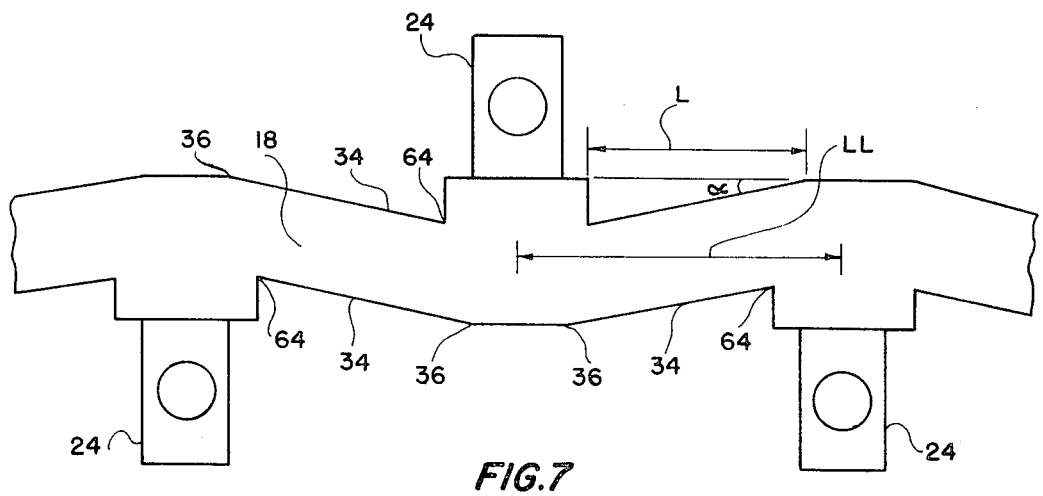
FIG. 7 is a top plan view of the annulus of FIG. 1.

Referring to FIG. 1 the invention generally comprises a resilient coupling denoted generally by numeral 10, for two generally coaxially aligned shafts 12 and 14. The coupling comprises an annulus 16 having a series of rectilinear, resilient, and compressible columns 18 connected with their longitudinal axes 20, as shown in FIG. 3, along the sides of a flat polygon 22. An arm 24 projects transversely from the longitudinal axes 20 at the intersection 26 of two adjacent columns 18. The arms 24 alternately project from the front and rear faces of each of the adjacent columns 18 with respect to the plane of the flat polygon 22. Hubs 28 and 30 are secured on each of the shafts 12 and 14 for receiving the alternate arms 24 on the annulus 16 respectively. Fasteners 32 operate radially through each arm 24 for securing the arms 24 to the hubs 28 and 30 and for decreasing the radius of the annulus 16 thereby placing the columns 18 under a precompressive load. A recess 34, shown in FIGS. 1 and 7, is formed on each of the front and rear faces of each column 18 extending from the projection of the arms 24 toward the opposite end 36 of each column 18 for reducing axial thrust forces created in the annulus because of compression of the annulus 16 during its assembly to hubs 28 and 30 and remaining during precompression of the annulus.

More specifically, the present invention as shown in FIG. 1 comprises a pair of generally axially aligned and substantially abutting shafts 12 and 14 which are to be coupled in a torque transmitting relationship by the resilient coupling denoted generally at 10. As illustrated herein, hubs 28 and 30 are mounted on shafts 12 and 14 and are to be joined by an annulus 16.

Hubs 28 and 30 may be secured to the shafts 12 and 14 in any suitable manner, as by set screws 38 being placed through correspondingly threaded apertures 40 in collars 42 formed on hubs 28 and 30, and tightened down on shafts 12 and 14, thus securing the hubs 28 and 30 to shafts 12 and 14. Hubs 28 and 30 have wedge shaped slots 44 in their perimeter. These slots 44 are, in the embodiment shown, spaced equally around the hubs 28 and 30. Centrally located in each slot 44 is a threaded aperture 46.

Adapted to fit in slot 44 are arms 24 that project from annulus 16. These arms 24 are wedge-shaped to conform to the shape of slots 44. These arms 24 also include an aperture 48 through which a fastener, such as a cap screw 32, extends for threading into aperture 46 in hubs 28 and 30. If desired, the aperture 48 may be counterbored as at 50 to receive the head of cap screw 32.

As illustrated herein, the arms 24 and the annulus 16 are one integral unit. The arms 24 are preferably metallic such as aluminum and are preferably molded in the annulus 16 as shown in FIG. 3 when the annulus is cast. This has the advantage that the resulting part is one piece, is easily and cheaply made, and more importantly, it is readily handled and installed.

Arms 24 project, alternately, first from one side of the annulus 16 and then from the other side. In the embodiment illustrated herein, four arms 24 project in one direction from the front face of annulus 16 and four arms 24 project from the rear face. The arms 24 on each face are preferably spaced 90° apart so that the angle between adjacent arms 24 is 45°. These arms 24 serve to attach the annulus 16 in staggered fashion to the hubs 28 and 30 on shafts 12 and 14. The distance or radius of these arms 24 from the axis of annulus 16 in its free state is 10 to 20 percent greater than the fixed distance or radius of slots 44 from the axis of shafts 12 and 14. As arms 24 are fitted in the slots 44 of hubs 28 and 30, they decrease the diameter of the annulus 16 and thus compress the material of annulus 16.

The arms 24 are of a length sufficient to span the distance 52 across the axial width of the annulus 16 and the axial width 54 of the slot 44 in the hubs 28 and 30. The arms 24 are preferably made of aluminum for reasons of strength. The aluminum arms 24 can be conveniently molded in the material from which the annulus 16 is made.

Figure 4:
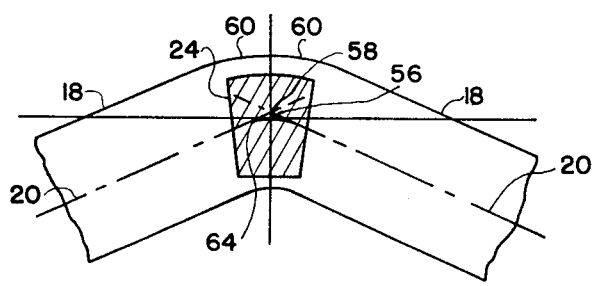
FIG. 4 is a detailed view of an arm means joint of FIG. 2.

Annulus 16 is comprised of a series of rectilinear, resilient, and compressible columns 18 connected with their longitudinal axis 20 on the sides of a regular polygon 22, as shown in FIG. 3. Still referring to FIG. 3, the arms 24 are positioned at the point of intersection 26 of the longitudinal axes 20 of two adjacent columns 18, such as 20L and 20R, and project transversely of the longitudinal axes 20 of the column 18. Referring to FIG. 4, as a practical matter the midpoint 56 of arm 24, is not the axis 20 of the two lines of intersection 58 of the axes 20 of two adjacent columns 18 because the adjacent corners 60 are preferably rounded to alleviate stresses. Accordingly, the center 56 of the arm 24 is positioned along the fillet radius 64 joining the axes 20 of two adjacent columns 18.

Figure 2:
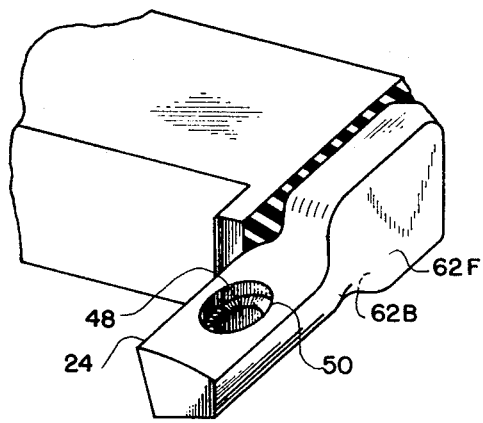
FIG. 2 is an isometric view of an arm means of FIG. 1.

The arms 24 are molded within the longitudinal columns 18 and are substantially the same width as the cross-sectional area of the column 18. It is preferred that the arm 24 be completely encapsulated in the resilient material of the column 18 to insure a sound bond of the arm 24 in the annulus 16, shown in FIGS. 2 and 3. The sides 62F and 62B of the arms 24 taper inwardly as illustrated by the dotted lines F and B. The sides 62F and 62B of two circumferentially adjacent arms 24 with one column 18 of the annulus 16 therebetween forms a substantially rectangular section of the column 18.

Annulus 16 is made of a resilient material, preferably from material such as rubber which is deformable under a compressive force. A plastic, such as polyurethane may also be used if desired. The nature of the resilient, compressible material, of course, will vary with the requirements in operation.

Advantageously, the rubber from which the annulus 16 is made has a Shore A durometer hardness of 55–65. If the material is too soft, it will, of course, deform too much and if it is too hard, it will impose bearing loads on the shafts 28 and 30 that are intolerable.

Figure 5:
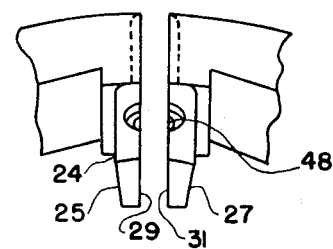
FIG. 5 is a detailed view of the split arm means of FIG. 1.

A further feature of this invention, as shown in FIG. 5, is that one of the arms 24 may be split along a radially extending plane passing through the center of the arm 24. This permits the annulus 16 to be spread apart so that it may be installed around shafts 12 and 14 when they are very closely coupled without the need for moving hubs 28 and 30. Even when the shafts 12 and 14 are not closely coupled, because of the nature of the coupling used, it had been necessary, heretofore, to back off the shaft in order to mount an annulus to the coupling hubs 28 and 30. The split annulus 16 of this invention overcomes the foregoing problem as the annulus 16 can be opened to be placed upon or removed from a shaft 12 or 14 or coupling unit 10. Another important feature of split arm 24, is that the sides 25 and 27 on each side of split arm 24 are tapered inwardly to correspond to the tapered sides of slot 44 in hubs 28 and 30. When annulus 16 is opened and placed around shafts 28 and 30, both ends of split arm 24 are then placed in one slot 44 and a cap screw 32 is placed through aperture 48. As the cap screw 32 is tightened into aperture 48, the tapered sides 25 and 27 of split arm 24 engage the tapered sides of slot 44 and; as the cap screw 32 is further tightened, the sides 29 and 31 are forced together by the wedging action created as the split arm is forced radially inward by cap screw 32. This wedging action will ensure that the split arm is always secured in slot 44, eliminating the possibility of the split arm 24 separating at the joint. These features of the split annulus 16 enables the application of the coupling 10 under conditions where it had been necessary heretofore to back one shaft away from the other in order to install the coupling.

The above-mentioned coupling has successfully overcome the aforementioned disadvantages and others, but, in its present state, it still contains an undesirable characteristic which, without being eliminated, could cause excessive axial thrust forces on the shafts bearings. It was found that the axial thrust forces that are created by placing it in compression are transmitted from the annulus, through the arms, through the hubs, through the shafts, and to the shafts bearings. Even at zero torque, zero axial misalignments, and zero offset misalignments, these axial thrust forces are appreciable, which cause excessive bearing wear and shortened the bearing life. These forces are unacceptable in many applications, but it has been discovered that through a change in geometry of the flexible element, these forces can be substantially reduced or even eliminated under conditions of no axial misalignment.

Referring now to FIGS. 1 and 7, generally this change in geometry comprises a recess 34 formed on each of the front and rear faces of each column 18 extending from the projection of the arms 24 toward the opposite end 36 of the columns 18. It was discovered that the addition of recesses 34 would effectively reduce the axial thrust forces after compression of the annulus 16.

More specifically, recess 34, as shown in FIG. 7, is wedge-shaped, tapering from its deepest point 64 adjacent the projection of the arms 24 to the surface 36 of each of the front and rear faces of each column 18. The length L of each recess 34 is a variable and may be less than one-half the length LL of each column 18, or it may be more than one-half the length LL of each column 18, or the length L may be substantially equal to one-half the length LL of each column 18. The dimensions of length L is based on that length which will produce the least amount of axial thrust forces for the correct size and configuration of the coupling to be used. It has been discovered that the preferred length L for most coupling applications is that length where the wedges are formed at substantially identical angles $\alpha$ on both the front and rear faces of each column 18 and will provide each column 18 with a substantially uniform cross-sectional area with respect to the flat sides of each column 18.

Figure 6:
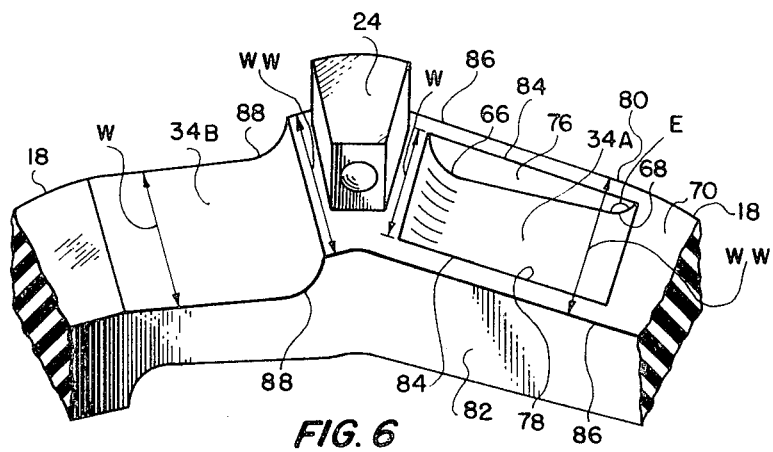
FIG. 6 is a perspective view of a portion of the annulus of FIG. 1, showing two different configurations of the recesses.

Referring now to the right hand portion of FIG. 6, a second type of recess may be formed which will also effectively reduce the axial thrust forces. This recess 34A is formed as a truncated wedge tapering from its deepest point 66 adjacent arm 24 to a point 68 below the surface 70 of column 18 and then rising at an angle E at point 68 to the surface 70. The preferred method of forming the angles at points 66 and 68 is to form them on a radius as shown, that is, a fillet radius, and not as a sharp angle as shown in FIG. 7 as point 64. It has been discovered that due to the extreme forces exerted on the annulus 16 during operation, the point at which the angle was formed would produce cracks in the annulus 16 if the angle was sharp, but forming the angles on a radius as shown in FIG. 6 would eliminate any such cracking. As shown in the right side of FIG. 6, the width W of the truncated wedge is less than the radial width WW of the front and rear faces of the column 18, thus the truncated wedge is formed within the confines of the periphery of the front and rear faces of each column 18 thereby forming walls 76 and 78 on each side of the truncated wedge. It is to be understood that the truncated wedge need not be formed within the confines of the periphery of the front and rear faces of each column 18, as shown, but may be formed at the top surface 80 or the bottom surface 82 thereby forming only one wall 76 or 78 between the edge 84 of the truncated wedge and the edge 86 of the column 18. The preferred method, is to have the width W of the truncated wedge equal to the radial width WW of the front and rear faces of column 18 thereby eliminating the side walls 76 and 78 such as shown for the recess 34B on the left side of FIG. 6. It is also to be noted that the angles formed at points 66 and 68 are variable, and can vary from where the angles formed at points 66 and 68 are substantially right angles thereby forming a recess 34 rectangular in shape, not shown, to where the angle formed at point 68 is zero, thereby forming a wedge-shaped recess 34, as shown in FIG. 7.

The preferred configuration of the recess 34 is as shown in the left hand portion of FIG. 6. Recess 34B is wedge-shaped as previously described, with the angle 88 formed on a radius and where the width W of the wedge is equal to the radial width WW of the front and rear faces of column 18. It has been found that, as a rule, for a rubber annulus with a Shore A durometer hardness of 55–65 a substantial reduction of the axial thrust forces is accomplished if the angle $\alpha$ of the wedge is 6° and the length L of the wedge is 55 percent of the length LL of the column 18. These proportions are preferred for most applications although experimentally, dimensions slightly different than the above can be found to provide zero axial thrust. It is to be understood that should an annulus be made with a Shore A durometer hardness different than that mentioned above the dimensions of the wedge will also vary. For example, should the element have a Shore A durometer hardness of less than 55 then the wedge will be formed with a smaller angle than 6° and a shorter longitudinal length than 55 percent of the longitudinal length of the column, and, should the element have a Shore A durometer hardness of greater than 65, then the wedge will be formed with a larger angle then 6° and a longer longitudinal length than 55 percent of the longitudinal length of the column.

However, it is to be further understood that the width W of the wedge may be less than the radial width WW of the front and rear faces of column 18 thereby forming at least one wall between the edge of the wedge and the edge of the column 18 as shown in the right hand portion of FIG. 6, and as previously described.

Figure 8:
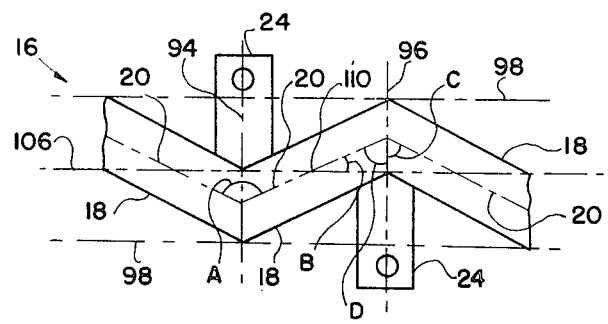
FIG. 8 is a top plan view of another configuration of the annulus for the resilient coupling of the present invention.

If desired, the wedges as previously described may extend completely from the center 94 of one axially projecting arm 24 to the center 96 of the next axially projecting arm 24 as shown in FIG. 8. That is, the deepest part of the wedge will be along the center 94 of arm 24, and will taper therefrom to the center 96 of the next arm 24, intersecting the plane surface of the polygon as illustrated by the dotted lines 98. This arrangement results in a series of alternating alterations or columns 18 that are staggered with respect to the center plane of the annulus 16 denoted by line 106. Thus, the longitudinal axes 20 of two adjacent columns 18 form an angle A at the intersection of the adjacent columns 18. Also the axial center plane of each column 18 crosses line 106 at approximately the circumferential midpoint of the column 18 at point 110. The angle B between line 106 and 20 preferably does not exceed 45°. Arm 24 projects perpendicularly to the plane of the annulus 16 as shown by the intersection of the center 94 of arm 24 and line 106. The arms 24 alternately project from the front and rear faces of each of the adjacent columns 18 and, each arm 24 will project from the face of annulus 16 where the longitudinal axes 94 and 96 the adjacent arms 24 of the longitudinal axes 20 of the adjacent columns 18 intersect to form acute angles C and D.

The preferred configuration and arrangement of the columns 18 is to have angle A always obtuse, but it should be understood that it is possible for angle A to be either an acute angle or a right angle.

It should be understood that whichever one of the configurations of the recesses chosen should be used on all columns, both on the front and rear faces thereof.

In operation, hubs 28 and 30 are placed upon shafts 12 and 14 and secured thereto in a conventional manner as, for example, by inserting a set screw 38 into the aperture 40 in collar 42 and then tightening the set screw 38 onto shafts 12 and 14. Shafts 12 and 14 are then placed in substantially coaxially and closely spaced relationship with the amount of end clearance between shafts 12 and 14 as desired. The annulus 16 is then spread apart at split 51 and placed around the shafts 12 and 14 and into position so that the arms 24 are mated with the recesses 44 in the hubs 28 and 30. The cap screws 32 are tightened to secure the arms 24 securely in the hubs 28 and 30 and to compress annulus 16. The annulus 16 is initially from 10 to 20 percent larger in diameter in its free state than when in its compressed state with the arms 24 secured in the hubs 28 and 30. Thus the arms 24 move radially inwardly to engage the recesses in the hubs 28 and 30, so that the diameter of the polygon which forms the annulus 16 is decreased. This means that the material between the arms 24 is compressed and thereby prestressed in compression.

The foregoing has presented a novel coupling which is readily removed for replacement and repair and which is readily inserted in position in the field. The resilient material which forms the annulus of this coupling is under compression; however, the annulus is not placed under compression until it is attached to the hubs as described. Thus, no compressive set is induced in the annulus as a result of shelf storage. The annulus is split to permit easy installation at the site. The coupling is flexible and resilient. The annulus's geometry has been improved to effectively reduce the axial thrust forces created by the compression of the annulus.

The coupling described above is a polygon of octagonal configuration. Obviously other polygons may be used if desired. The column between the arms may be curved so that the annulus is or approaches a circular configuration, especially in its free state, but the performance of a circular configuration, i.e., one in which the columns are curved rather than the straight columns of a polygon, is inferior. The reason is believed to be that the columns of a round annulus are subjected to eccentric loading which induces buckling at relatively low stresses.

Accordingly, the invention having been described in its best embodiment and mode of operation, that which is desired to by claimed by Letters Patent is:

I claim:

1. A coupling for two generally coaxially aligned shafts comprising:
   an annulus having a series of rectilinear, resilient, and compressible columns connected with their longitudinal axes along the sides of a flat polygon;
   an arm means projecting transversely of said longitudinal axes at each intersection of two adjacent columns;
   said arm means alternately projecting from the front and rear faces of each of said adjacent columns with respect to the plane of said flat polygon;
   a hub means on each of said shafts for receiving alternate ones of said arm means respectively; and
   a fastening means operative radially through said arm means for securing said arm means to said hub means and decreasing the radius of said annulus thereby placing the columns under a precompressive load,
   said annulus further including:
   a recess on each of said front and rear faces of said columns extending from the projection of said arm means toward the opposite end of said columns for reducing axial thrust forces during compression of said annulus.

2. The coupling of claim 1 wherein said recesses are wedge shaped tapering from their deepest points adjacent the projection of said arm means to the surface of said faces.

3. The coupling of claim 1 wherein the length of said recesses is less than one-half the length of said columns.

4. The coupling of claim 1 wherein the length of said recesses is more than one-half the length of said columns.

5. The coupling of claim 1 wherein the length of said recesses is substantially one-half the length of said columns.

6. The coupling of claim 2 wherein said wedges are formed at substantially identical angles on said front and rear faces of each of said columns to provide said columns with a substantially uniform cross-sectional area with respect to the flat sides of each of said columns.

7. The coupling of claim 1 wherein said recesses on each of said front and rear faces of said column are truncated wedge shaped for reducing said axial thrust forces.

8. The coupling of claim 1 wherein said recesses on each of said front and rear faces of said column are rectangular in shape for reducing said axial thrust.

9. The coupling of claim 1 wherein the width of said recesses is less than the radial width of said front and rear faces on said column thereby forming at least one wall between the edge of said recess and an edge of said column.

10. The coupling of claim 1 wherein the width of said recesses is substantially equal to the radial width of said front and rear faces of said column.

11. The coupling of claim 2 wherein the angle formed by the intersection of a top surface of each of said wedges with said faces is substantially 6° and the longitudinal length of said wedges is substantially 55 percent of the longitudinal length of said columns.

12. The coupling of claim 1 wherein one of said arm means is split thereby forming two ends of said annulus which may be separated for placing said annulus about said shafts.

13. The coupling of claim 1 wherein:
said arm means are integral with said annulus;
said arm means being generally wedge-shaped with the smaller end of said wedge directed toward the axes of said shafts; and
said hub means having correspondingly wedge-shaped slots adapted to receive said arm means upon radial compression of said annulus by said fastening means.

14. The coupling of claim 13 wherein said fastening means comprises screw means extending radially through each of said arm means and into said slots for securing said arm means to said hub means.

15. An elastomeric annulus for connecting a pair of adjacent hubs attached to two generally coaxially aligned shafts, said annulus including:
a series of rectilinear, resilient, and compressible columns connected with their longitudinal axes along the sides of a flat polygon;
an arm means projecting transversely of said longitudinal axes at each intersection of two adjacent columns;
said arm means alternately projecting from the front and rear faces of each of said adjacent columns with respect to the plane of said flat polygon; and
a recess on each of said front and rear faces of said columns extending from the projection of said arm means toward the opposite end of said columns.

16. The annulus of claim 15 wherein said recesses are wedge-shaped tapering from their deepest points adjacent the projection of said arm means to the surface of said faces.

17. The annulus of claim 15 wherein the length of said recesses is less than one-half the length of said columns.

18. The annulus of claim 15 wherein the length of said recesses is more than one-half the length of said columns.

19. The annulus of claim 15 wherein the length of said recesses is substantially one-half the length of said columns.

20. The annulus of claim 15 wherein said recesses on each of said front and rear faces of said column are truncated wedge-shaped for reducing said axial thrust forces.

21. The annulus of claim 15 wherein said recesses on each of said front and rear faces of said column are rectangular in shape for reducing said axial thrust.

22. The annulus of claim 15 wherein the width of said recesses is less than the radial width of said front and rear faces of said column thereby forming at least one wall between the edge of said recess and an edge of said column.

23. The annulus of claim 15 wherein the width of said recesses is substantially equal to the radial width of said front and rear faces of said column.

24. The annulus of claim 16 wherein the angle formed by the intersection of a top surface of each of said wedges with said faces is substantially 6 degrees and the longitudinal length of said wedges is substantially 55 percent of the longitudinal length of said columns.

25. The annulus of claim 15 wherein one of said arm means is split thereby forming two ends on said annulus which may be separated for placing said annulus about said shafts.

26. The annulus of claim 15 wherein:
said arm means are integral with said annulus; and
said arm means being generally wedge-shaped with the smaller end of said wedge directed toward the axes of said shafts.

27. An elastomeric annulus for connecting a pair of adjacent hubs attached to two generally coaxially aligned shafts, said annulus including:
a series of resilient and compressible columns connected as alternating alterations so that the longitudinal axes of two adjacent columns form an angle at the intersection of said adjacent columns;
an arm means projecting perpendicular to the plane of said annulus at each intersection of said two adjacent columns;
said arm means alternately projecting from the front and rear faces of each of said adjacent columns with respect to the plane of said annulus; and
said arm means projecting from each of said faces where the intersection of the longitudinal axis of said arm and the longitudinal axes of said adjacent columns form acute angles with respect to each of said adjacent columns.

28. The elastomeric annulus of claim 27 wherein said longitudinal axes of said adjacent columns form an acute angle.

29. The elastomeric annulus of claim 27 wherein said longitudinal axes of said adjacent columns form an obtuse angle.

30. The elastomeric annulus of claim 27 wherein said longitudinal axes of said adjacent columns form a right angle.

* * * * *